(12) United States Patent
Spencer, II

(10) Patent No.: US 7,635,086 B2
(45) Date of Patent: Dec. 22, 2009

(54) COVERS HAVING RFID FUNCTIONALITY FOR PORTABLE ELECTRONIC DEVICES

(75) Inventor: Carroll Alexis Spencer, II, 4236 Gordon Rd., Wilmington, NC (US) 28405

(73) Assignee: Carroll Alexis Spencer, II, Wilmington, NC (US)

( * ) Notice: Subject to any disclaimer, the term of this patent is extended or adjusted under 35 U.S.C. 154(b) by 794 days.

(21) Appl. No.: 11/256,313

(22) Filed: Oct. 21, 2005

(65) Prior Publication Data

US 2006/0086786 A1    Apr. 27, 2006

Related U.S. Application Data

(60) Provisional application No. 60/621,128, filed on Oct. 22, 2004.

(51) Int. Cl.
    *H04Q 5/22* (2006.01)

(52) U.S. Cl. .................................... 235/380; 340/10.1
(58) Field of Classification Search ................ 235/380, 235/381; 340/10.1
    See application file for complete search history.

(56) References Cited

U.S. PATENT DOCUMENTS

| | | | | |
|---|---|---|---|---|
| 5,528,222 | A * | 6/1996 | Moskowitz et al. | 340/572.7 |
| 6,073,840 | A * | 6/2000 | Marion | 235/381 |
| 6,456,039 | B1 * | 9/2002 | Lauper et al. | 320/107 |
| 2003/0146821 | A1 * | 8/2003 | Brandt | 340/10.1 |

* cited by examiner

*Primary Examiner*—Daniel A Hess
(74) *Attorney, Agent, or Firm*—Triangle Patents, PLLC

(57) ABSTRACT

A cover for electronic hand-held devices providing RFID-operability and/or other functional keypad overlay to extend or expand the operation of the device to permit the user to perform additional actions or transactions facilitated by the RFID-operable cover. Method of using the cover for conducting business transactions are also included.

16 Claims, 5 Drawing Sheets

COVERS HAVING RFID FUNCTIONALITY FOR PORTABLE ELECTRONIC DEVICES

CROSS-REFERENCE TO RELATED APPLICATIONS

The present invention claims priority from U.S. provisional patent application No. 60/621,128 filed Oct. 22, 2004, which is incorporated herein by reference in its entirety.

BACKGROUND OF THE INVENTION (1) Field of the Invention

The present invention relates generally to marketing and sales tools involving user interfaces on portable devices, and, more particularly, to strategic placement of radio frequency identifiers (RFID) on, within, connected or integrated with portable electronic device keypad covers or overlays, including applications for wireless devices.

(2) Description of the Prior Art

Brand strategy is the business of developing brands based on thorough marketing knowledge and insight. It is a physical expression of how a business direction and key messages will communicate and establish value effectively across a broad range using several mediums to enhance awareness, impact and equity of the brand, in short increasing companies "goodwill" which is often more valuable than the break-up value of the companies assets. Marketing often takes advantage of the interface between a consumer and an object to create intangible value in the form of branding some business' product or service. Examples of such interfaces include billboards, packaging, and electronic displays (TV screens and computer monitors). Use of such interfaces creates commercial goodwill helping businesses sell their products and/or services.

Recently, in today's mobile information society, an unexploited and increasingly ubiquitous consumer-object interface has arisen, namely the use of wireless devices as an integral part of daily living. Although such devices often advertise the manufacturer of the device itself by including an identifying mark somewhere on the device, generally such marks are not interactive or functional and do not provide the end user with any true commercial function, in our model the consumer may through the mark itself interact in some way with the business, its product or services/functionality of his/her choice. The mark is non-functional at present. Thus, there is a need and opportunity for functional key overlays, or marks on wireless devices that function to induce and/or permit a consumer to interact with a business, its product or services, i.e., to purchase, order, request information or conduct some other business-related action and/or transaction using the user interface. RFID is defined as follows as it relates to this invention and can be present on the case, covering, encasement, overlay or wrapping. Radio Frequency Identification Technology to include Active RFID, Passive RFID, and newer technologies being developed in RFID such as Near Field Communication RFID. Active RFID is typically either powered or uses a transponder type system which actively emits and or receives in some manner. Passive RFID technology is typically activated by reflecting a signal emitted from an external reader or electronic device . An example of passive RFID technology is the Speedpass system manufactured by Texas Instruments and distributed by Exxon/Mobil. Newer technologies being developed include such variations as Near Field Communication RFID which in its simplest form can combine advances such as more secure communications accomplished by in one variation touch of one device to another. These examples are not meant to exclude any variation of RFID but to include both past, present and future forms of Radio Frequency Identification technology and their various incarnations for single and multiple purposes.

By contrast to the prior art, such as basic cell phone covers that are static, i.e., have little or no functionality, and which require new base equipment for increased functionality over older systems or devices, the present invention is capable of being used with future and/or existing and/or older equipment to enhance by multiple utilization of RFID and/or functional key overlays associated directly with the cover itself, which, when used in combination with any of the electronic devices provides functional enhancement not initially available on the base device itself and/or overriding the initially available or programmed functionality of the base device without the cover according to the present invention. The present invention recognizes and solves this developing marketing need and opportunity to place more control and ease of action and/or transaction in the hands of consumers. In a society that is becoming increasingly more mobile, this solution provides both parties with a tool, which increases and/or creates efficiencies, and is very effective.

SUMMARY OF THE INVENTION

The present invention is directed to a device and method for marketing a business through a cover having RFID device connected thereto, wherein the cover fully encloses or encases a wireless device and provides a user interface for the user to perform transactions with the device, the cover also having strategic placement of functional branding overlaid on keys or buttons of the device, as well as to a method of using the same.

The present invention is directed to RFID-operable covers for wireless devices, the covers including RFID devices connected thereto and the covers having a mark or logo or informative identifier, something immediately recognized by the consumer as a functional key, which is operable for performing a transaction when activated by the user; this will be known from this point forward as the button(s). One aspect of the invention is to provide identifiers on the cover such as logos or trademarks or informative identifiers on/beneath/above/around a functional telephone keypad overlay of a device cover that fully encloses or encases the device, wherein the device further includes RFID operability, in particular the cover being applicable to a wireless device having cellular phone, music, and/or gaming capabilities. The present invention provides a system with applied RFID technology to, on, within or integrated with a case or cover combinable with the base device, wherein the case or cover is external to the wireless or electronic device, i.e., it is not integrated with the phone body or primary housing directly, but attached or overlayed thereto via a case, encasement, overlay, cover or wrapping. This is intended to include two components, i.e., RFID and/or functional key overlay of the invention that can be present either independently or together on the case.

Another aspect of the present invention is to allow that such functional telephone or facilitation keypad overlays and RFID associated with the cover for portable electronic communications devices, such as cell phones, facilitate interaction of a consumer with a business, its products or services in order to conduct a business-related or consumer driven action and/or transaction.

These and other aspects of the present invention will become apparent to those skilled in the field, or discipline after reading of the following description of the preferred embodiment when considered with the drawings.

DETAILED DESCRIPTION OF THE INVENTION

Figure 1:
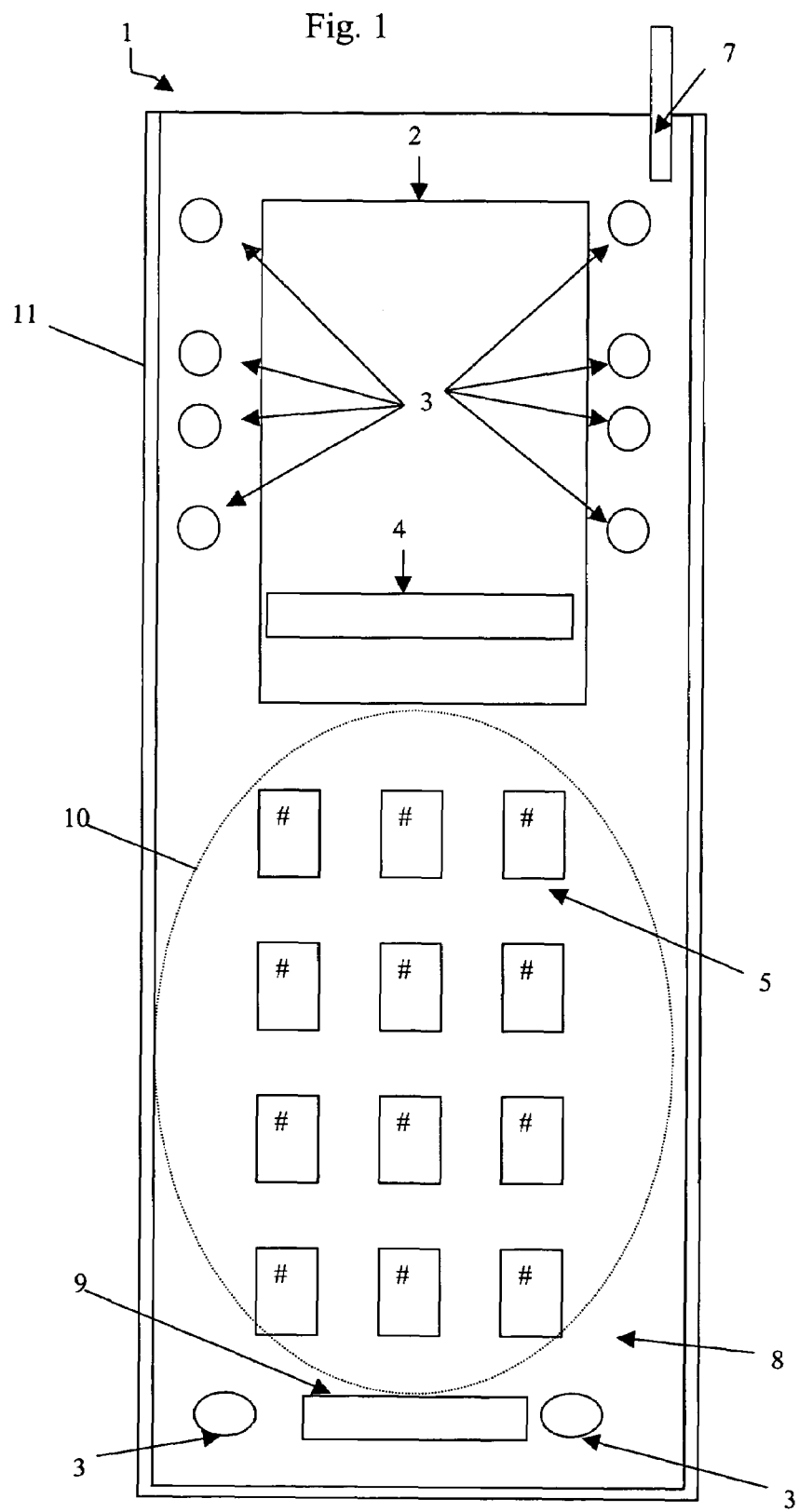
FIG. 1 is a front view of a cell phone according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

By contrast to the prior art, such as basic cell phone covers that are static, i.e., have little or no functionality, and which require new base equipment for increased functionality over older systems or devices, the present invention is capable of being used with future and/or existing and/or older equipment to enhance by multiple utilization of RFID and/or functional key overlays associated directly with the cover itself, which, when used in combination with any of the electronic devices provides functional enhancement not initially available on the base device itself and/or overriding the initially available or programmed functionality of the base device without the cover according to the present invention.

An accessory case or cover that covers and fits over the face surface of a phone, cellular, wireless devices or electronic device such as cell phones/hybrid cell phones or personal digital assistants, or electronic music device, such as an MP3 player, the invention including functional key overlays, RFID-based devices connected to or integrated with covers for these electronic devices, and combinations thereof, and having the following capabilities:

An accessory case or cover that is sized and constructed to fit generically over a portable hand-held electronic device and/or specifically sized for a single device type, wherein the cover combines logos or information printed on the case cover specifically on the clear plastic overlaying the keys and is tied to software resident on the phone or within its memory or downloaded to the phone via wireless or communication means and that activates a functionality, service or points the device to a web site when a series of keys or single key is depressed that is associated with the functional or facilitation key overlays and/or RFID functionality of the cover, case or overlay, or real-time or delayed wireless software interactivity. Preferably, the software may be included with the cover, case, or overlay, such as included on an embedded microchip or microprocessor, downloadable software, software resident on the electronic communication and/or entertainment device, software updates thereto, and combinations thereof. The software provides for the functionality of the functional or facilitation key overlays as set forth in this description. Also, preferably, the software permits functional or facilitation key overlays to associate with GPS for location-based services provided when the RFID-operable cover that fully encases the electronic device is taken by the user within a predetermined proximity of a business or machine having RFID receiver/transmitter capabilities and is programmed for communication with the device, in particular when activated by the user.

The present invention provides a device and method for marketing a business through a cover having RFID device connected, embedded, inserted or attached thereto, wherein the cover fully encloses or encases a wireless device and provides a user interface for the user to perform transactions with the device, the cover also having strategic placement of functional branding overlaid on keys or buttons of the device, as well as to a method of using the same.

The present invention provides RFID-operable covers for wireless devices, the covers including RFID devices connected, embedded, inserted or attached thereto and the covers having a mark or logo or informative identifier, something immediately recognized by the consumer as a functional key, which is operable for performing a transaction when activated by the user; this will be known from this point forward as the button(s). The functional or facilitation key overlay on the cover preferably include logos or trademarks or informative identifiers on/beneath/above/around the functional or facilitation telephone keypad overlay of a device cover that fully encloses or encases the device, wherein the device further includes RFID operability, in particular the cover being applicable to a wireless device having cellular phone, music, and/or gaming capabilities.

The present invention provides a system with applied RFID technology to, on, within or integrated with a case or cover combinable with the base device, wherein the case or cover is external to the wireless or electronic device, i.e., it is not integrated with the phone body or primary housing directly, but attached or overlayed thereto via a case, encasement, overlay, cover or wrapping. This is intended to include two components, i.e., RFID and/or functional or facilitation overlay, of the invention that can be present either independently or together on the case.

Also, the present invention allows such functional or facilitation telephone keypad overlays and RFID associated with the cover for portable electronic communications devices, such as cell phones, to facilitate interaction of a consumer with a business, its products or services in order to conduct a business-related or consumer driven action and/or transaction.

The present invention also includes a device or system for applying RFID technology to a case or cover that is external to the wireless or electronic device, i.e., it is not integrated with the phone body or primary housing directly, but attached or overlayed thereto. This is intended to include two components, i.e., RFID and/or functional or facilitation overlay, of the invention that can be present either independently or together on the case.

Preferably, the case, cover, or overlay includes materials that are natural, synthetic, and combinations thereof. By way of example and not limitation, polymeric or plastic material, neoprene, GORE-TEX, leather, and the like are used for the cover or overlay. Preferably, performance enhancements such as water-resistance, temperature insulative, impact resistance are used. Also, preferably, materials capable of coloration, imprinting, and other asthetically modifiable surfaces are used for personalization, branding, etc.

Accessory cases or covers of the prior art may already include branding marks, such as company logos which work on the specific brand or device makers equipment; however, nowhere in the prior art exists a generic (non-proprietary) cover or case that fully encloses or fully encases the phone or portable communication or portable electronic device wherein the cover or case includes RFID functionality included in, on, or integrated with the cover or case which can function independently of the phone or electronic device. The cover for the purpose of RFID payment could be taken from the device placed in a pocket or purse and function from a hand held position independent from the device for which it is intended to protect. The cover in and of itself serves to protect the actual hardware of the device as well as serving as a mini-billboard for advertising and/or as a storage vessel for the RFID micro chips or download recipient of a data chip. Importantly, the cover is not merely a face plate, it fully encloses or encases the device, i.e., it is a protective cover or encasement while at the same time having singular or dual functionality with also the capability of having branding that has operability or functionality in addition to merely being branding or advertising, while also the branding has the potential of revenue generation to support the cost associated with the functionality elements of the cover including but not limited to development cost, sales cost, marketing cost, distribution cost of the RFID and/or functional button/s. Additionally, the present invention differs from existing faceplates in that it is a protective cover that fully encloses the phone and that it is not limited to one specific handset, device type, or device manufacturer. It further has no direct attachment to the phone, i.e., it does not snap on or connect directly to the shell of the phone but rather wraps around, encloses or encases the phone, wireless device, or electronic device. Thus, the present invention provides a device further including an RFID-operable case and/or functionality added above the keys or keypad of the device, wherein the functional key overlay being a logo that is tied directly to a software functionality either already resident on the phone or downloaded to the phone to create a functioning interface between phone and accessory case. Examples of portable electronic devices particularly include handheld portable entertainment devices, such as music players or game devices.

Also, the present invention is operable to provide RFID lottery payment system such that the device having the cover with RFID and/or functionality of the case or cover. For example a convenience store or self-serve type lottery stations (like a vending machine) would be RFID-enabled so that users having the cover with RFID for the portable electronic devices automatically purchase tickets through payment on the user's account associated with their personal RFID on, in, within, connected to or integrated with the cover or case for the device. Alternatively, the electronic downloading of the ticket information or advertising to users having the RFID-functional covers or cases for the electronic device. The operability of the RFID-enabled device cover or case is associated with proximity to a business or machine that is RFID-communication enabled, such as credit card purchases, or prepaid debit or credit cards, in particular in the case of lottery ticket purchases. Branding reinforcement of the lottery or other games via RFID-operable cover or cases.

An accessory case or cover for cell phones/wireless devices/digital cameras/PDAs/hybrid cell phones, or smart phones and portable music players. that has an RFID or Mobile Commerce component built into the case itself or attached through some means to the case, cover, overlay, encasement or wrapping. The RFID component can be either active or passive and can include advances in current RFID technology including near field communication, swipe based systems or use at a distance. Other forms of mobile commerce are also included such that the accessory case becomes a functioning mobile wallet, debit or charge based system, or identification or token based system such as is used within a subway system.

Examples of systems currently in place that are operable to utilize the new combinations, including functional key overlays, RFID-devices embedded in, inserted in, connected to, or integrated with covers for the devices, and combinations thereof, associated with the present invention include, but are not limited to the Exxon/Mobil Speedpass™ system or American Express's ExpressPay™ for RFID payment or Mastercard's Paypass™ system, which is being developed for commercial application by Mastercard.

A basic description of functional key overlays is presented herein, but is intended to be considered in conjunction with the accessory case and/or functional or facilitation keypad overlay outlined hereinabove.

Figure 2:
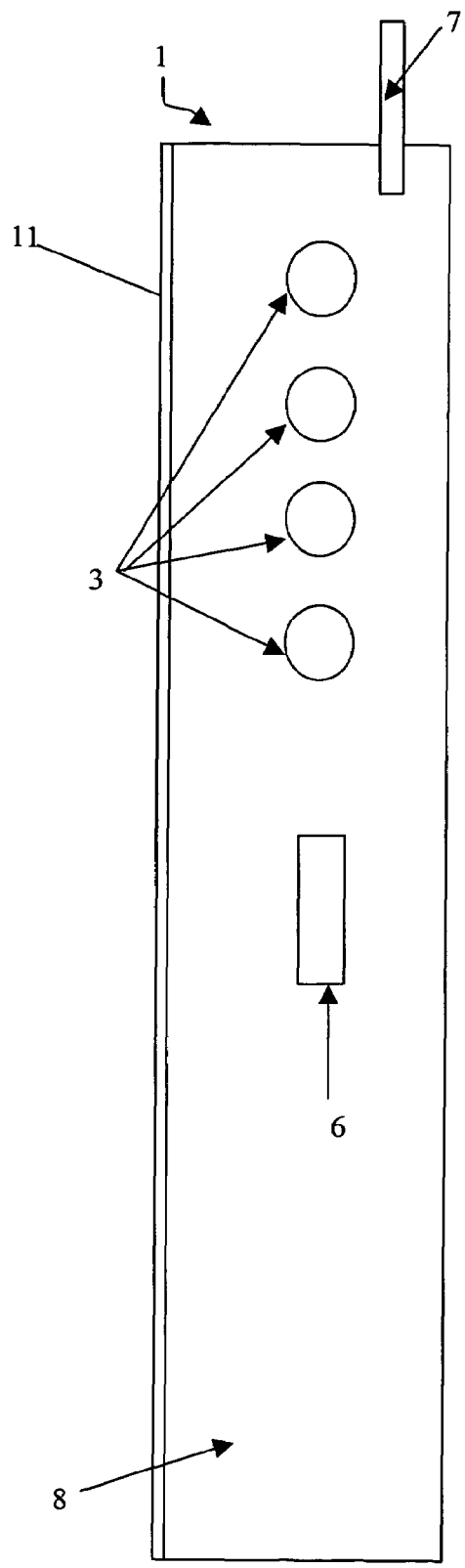
FIG. 2 is a side view of a cell phone according to one embodiment of the present invention.
Figure 3:
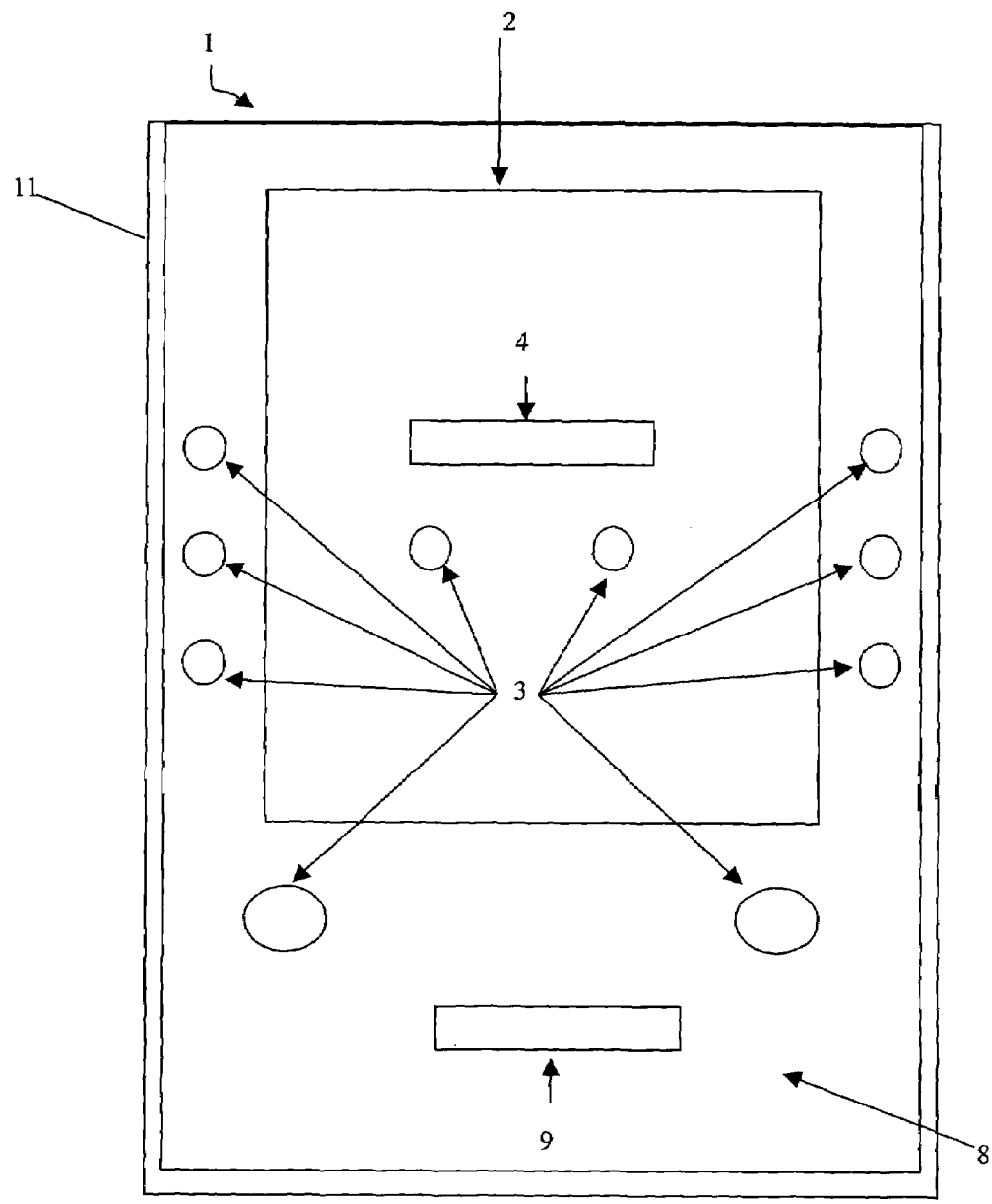
FIG. 3 is a front view of a personal digital assistant according to one embodiment of the present invention.
Figure 4:
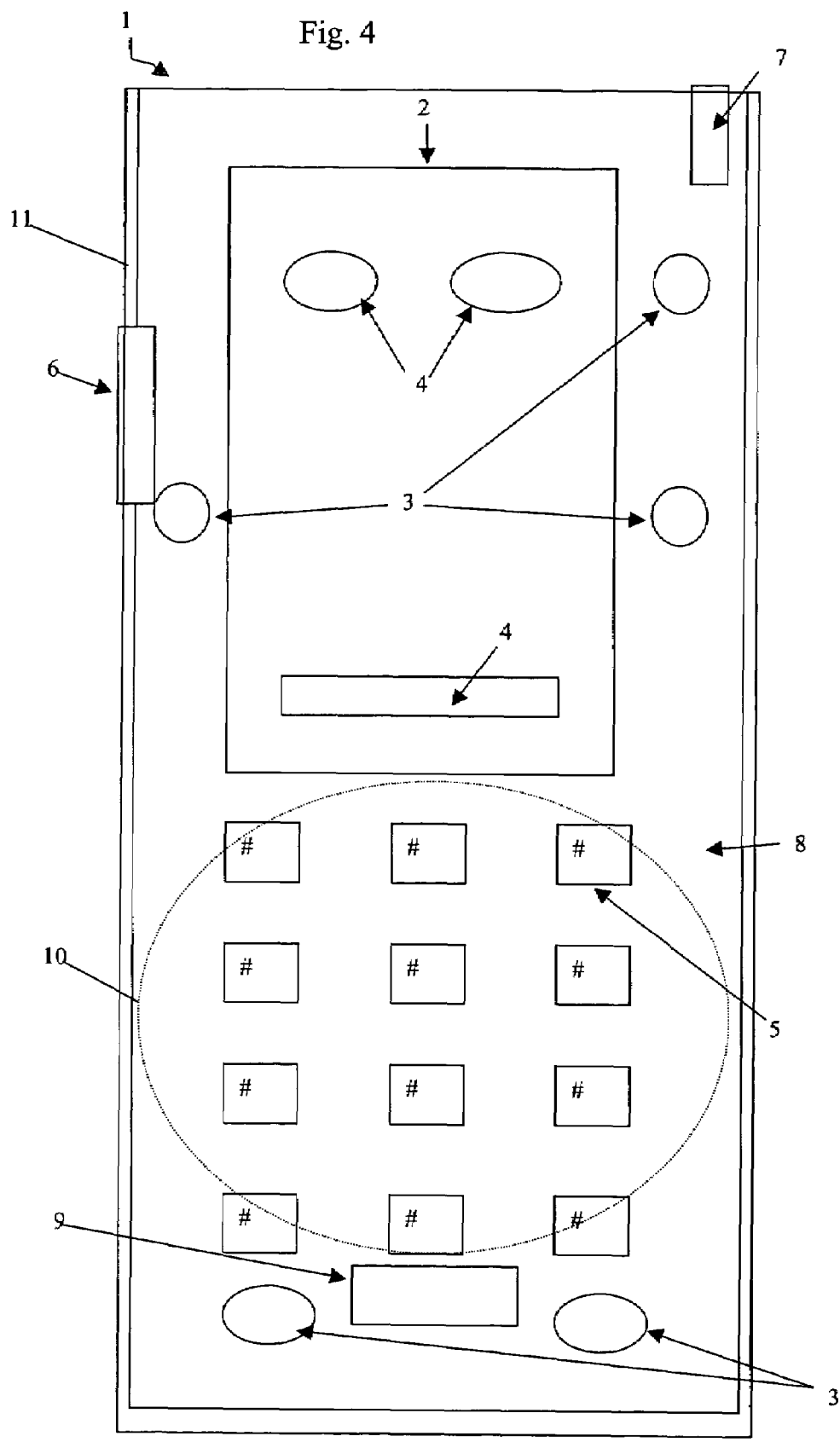
FIG. 4 is a front view of a hybrid wireless device-personal digital assistant according to one embodiment of the present invention.

Referring now to the drawings in general, the illustrations are for the purpose of describing a preferred embodiment of the invention and are not intended to limit the invention thereto. FIGS. 1 and 2, FIG. 3 and FIG. 4 illustrate preferred embodiments of the invention on wireless devices referred to generally with the reference numeral 1. Wireless devices are broad in device but for our purposes at present include cell phones, personal digital assistants (PDAs), hybrids of cell phones and smartphones. Traditional telephones are known in the art and include handsets having keypads thereon. FIG. 1 and 2 illustrate the invention on a cell phone. FIG. 3 illustrates one embodiment of the present invention on a PDA. FIG. 4 illustrates the invention on a hybrid wireless device-PDA.

The present invention provides for strategic placement of functional or facilitation key overlays on a functional or facilitation telephone keypad overlay, in particular for wireless devices, so they are directly associated with a functional or facilitation component, namely a function or facilitation button or button(s). Preferably, the functional or facilitation key overlays are marks such as brands, names, symbols, logos, trademarks or labels. Alternatively, the functional or facilitation key overlays may also include generic words such as "buy", "sell", etc.

The functional or facilitation components of the wireless device form part of the user interface between the device and the user or consumer that is embodied in the functional or facilitation telephone keypad overlay. Referring now to FIGS. 1 and 2, and FIG. 3 and FIG. 4, in a preferred embodiment, a cover having an RFID device connected, inserted or attached thereto or integrated therewith also further includes a functional or facilitation telephone keypad overlay 1. Referring to FIGS. 1 and 2, and FIG. 3 and FIG. 4, the phone or cellular phone components may further include an electronic display 2, physical buttons 3, or other interactive components on wireless devices, such as a virtual keyboard or virtual buttons that are produced by projection and light detection means.

A functional or facilitation key overlay may be placed on, beneath, above, around and/or near the surface of the cover having RFID operability 11. As seen in FIG. 1 and FIG. 4, in a preferred embodiment a functional or facilitation key overlay on the cover having an RFID device included therewith 5 may be further associated with corresponding one of the numbers on a key pad 10 located on a phone or phone-capable wireless device 1. The placing of a functional or facilitation key overlay of the functional telephone keypad overlay on a functional component or above a functional component is termed applying the functional key overlay via the functional telephone keypad overlay. A functional component to which a functional key overlay has been applied is considered a marked or identified functional component. More than one functional component may be marked or identified on a wireless device via the functional telephone keypad overlay. Because of the overlay itself, no functional key overlay is applied to a physical function button on a wireless device by a manner such as printing, painting, embossing, adhesives, etc.

In the case of an electronic display 2 a functional or facilitation key overlay may be applied by electronic display of an electronic or digital button 4 based upon its location on the surface of the functional telephone keypad overlay that corresponds to a location over the phone display when the overlay is applied to the phone. An electronic display may be a touch screen. The user of the device interacts with the company whose mark is used as the functional key overlay on the functional telephone keypad overlay by activating or pressing the function button so marked; a business-related action and/or transaction occurs by that activation of the button by the user, e.g., a product is purchased, such as a beverage being purchased on location using equipment or from a machine that is programmed to communicate with the wireless device. A user or consumer may touch the electronically displayed functional key overlay on the functional telephone keypad overlay to achieve some action and/or transactional end as with a physical function button directly located on the phone or cellular/wireless device itself.

In a preferred embodiment, the RFID device associated with the cover that fully encloses a device when applied thereto further includes a functional keypad overlay for the electronic device, wherein the RFID device and the functional keypad overlay is pre-programmed, programmable and/or may be predetermined by the manufacturer. The RFID and/or functional keypad overlay of the cover may be considered dedicated to the services, products, functions associated with mark with which it is identified, i.e., it serves a practical marketing and advertising function that provides business value to the business associated with the branding, as well as making the cover and device operable for performing business transactions with the company, or operating to perform a service provided by the company, such as security passage or authorization, user identification or authorization for proximity or security clearance, attendance, presence within a predetermined proximity, or tracking of the device via the RFID in the cover. Data linking of the cover with RFID operability is also provided with the present invention. Alternatively, a user or consumer programs a functional component to a functional key overlay of the cover.

In a preferred embodiment, the RFID device attached to, connected to, integrated with, or inserted in the cover and the functional key overlays and their related or corresponding functional components may be located anywhere on the cover and the corresponding surface of the phone or wireless device thereunder; the functional key overlays on the functional telephone keypad overlay may be juxtapositioned physical buttons on the phone or wireless device itself. Also, there may be at least one, but preferably a multiplicity of functional key overlays on the functional telephone keypad overlay and related or corresponding functional components, i.e., individual physical buttons. Additionally or alternatively, each button may have more than one functional key overlay on the functional telephone keypad overlay associated therewith or corresponding thereto. Preferably, each button has at least one functional key overlays and/or RFID-operable covers.

In FIGS. 1, 2, 3 and 4, the functional key overlay's position on the functional telephone keypad overlay relative to the function component or button is represented by the arrows from component 8 indicating empty spaces or zones on a wireless device 1 that are proximal to buttons but not directly on the components or buttons themselves. In a preferred embodiment, as seen in FIG. 2 and FIG. 4, a functional key overlay 6 is placed on the surface of the functional telephone keypad overlay that corresponds to a functional component located on a side of the wireless device 1.

By way of example but not limitation, the following design example provides a description of the application of the RFID-operable cover applied to a particular hand-held electronic device, namely a cellular phone. Functional components on the phone under the functional telephone keypad overlay include components like numeric buttons normally found on a phone or wireless device or components added to a phone or wireless device for more function options for consumers. Also, the functional components may have various shapes and sizes, so long as they are sized and configured for use by the user of the device. A functional key overlay on a functional telephone keypad overlay may also be placed on a component for which a function button is not normally associated. By way of example, not limitation, as seen in FIG. 1 and 2 and FIG. 4, a functional key overlay is placed on an antenna 7 attached to wireless device 1.

A user or consumer interacts with a phone or phone-capable wireless device for some interactive purpose. In a preferred embodiment, functional components on the phone or wireless device may serve numerous functions including dialing, connecting, starting or transacting. These functions serve to implement the consumer or user's interactive purpose, i.e., to make a business-related action and/or transaction without requiring additional user action. In a preferred embodiment, a consumer or user activates, selects or presses a marked functional key overlay on a functional telephone keypad overlay associated with a component on a wireless device, such as a physical function button, and the device interacts with the company represented by that identifier, e.g., by making a business action and/or transaction or purchase using a credit card or by dialing a phone number to connect a consumer or user to a predetermined destination such as a business's information, help, service or product center, or professional services group tracking previously ordered product without requiring additional user action. Note that the user may provide additional information, such as a unique user identifier or authorization or confirmation of the action and/or transaction, at a subsequent level in the interaction with the company, its products and/or services, although establishing the initial interaction with the company does not require additional user action.

Also, the present invention provides for RFID-based cover to be operable for secure payment for any transaction authorized by the user from the device having the cover and RFID operability. Such a payment system may be integrated with SMS, MMS or other notification and/or PIN or other identification response system to ensure that the transaction is properly authorized, recorded or documented and processed in such a manner to preserve user account and identification security. By way of example and not limitation, the user in possession of a portable hand-held electronic device with the "smart" cover having RFID operability and/or functional key overlay moves into proximity of a business, location or other machine that is RFID-operable having receiver/transmitter and processing capability for the purpose of conducting a transaction such as product or service purchase, and the RFID-operable cover enables the user of the device to process the intended transaction in a secure, user-authorized manner as set forth herein.

In another preferred embodiment, interaction with a functional component permits a consumer or user to facilitate actions and/or transactions, including those having an education component. These actions and/or transactions may include the purchasing, depositing, transferring and charging to or from another institution, or other financial transactions or actions, including education and information-based actions. Such actions and/or transactions may include stock market related transactions such as the buying, or selling of securities related instruments. Actions and/or transactions may also include the use of credit cards, debit cards, and/or smart cards. In one preferred embodiment, the mark of a credit card company may be placed on/beneath/around or near the component or button(s) and when the consumer executes the component or button the account of the consumer will be debited for the purchase. In another preferred embodiment, a beverage company's logo may be placed on/beneath/around or near the component or button(s) and the consumer purchases a beverage from a vending machine by pressing the component or button(s) identified by a mark of the beverage company. In another preferred embodiment, a consumer's financial institution has its logo placed on/beneath/around or near a button(s) and the consumer may interact with his or her account by pressing or selecting the component or button(s). In another preferred embodiment, a branded button is used as an aid to facilitate discounting and other promotional and advertising facilities.

In another embodiment, the user's interaction with a company, and its products or services via a functional component on a phone or wireless device may also connect a consumer or user to a website on the Internet, from here the consumer can download a menu, from here the client could choose the direction to take, such as purchasing, checking account status and new deals or specials. The website may be an Internet service, chat service, on-line store, or may be a hosted ASP site, or any pre-determined Internet destination including B2B, and B2C. Also, activation of the function component or button may launch another service, like messaging services, such as AOL Instant Messenger provided by America On-Line, which are not website-dependent. As set forth in the foregoing, in a preferred embodiment the invention includes the option of the user preprogramming the destinations of their choice.

In another embodiment, interaction with a functional component starts a device such as a computer, a car, a radio, a television, or any electronic or mechanical device and could also include the retrieval of data such as lights on, and TV's off, even so far as being able to indicate or trigger an electronic-based security system of one's domicile.

A key aspect of this invention is any use of a marked functional key overlay on the RFID-operable cover to reinforce brand consciousness or awareness in the consumer or user. Single logo, mark, slogan or multiples may be used on the cover and functional key overlay. The combination of the mark and the functional component as well as the RFID, whether active or passive, facilitates actions/business actions and/or transactions by reducing the time for the user to implement an action and/or transaction. Transactions and/or actions are made more efficient, due to the fact that the consumer can quickly and easily scan a wireless device and immediately identify the mark associated with the action and/or transaction the consumer needs to implement or by using the RFID operability associated with the cover on the device; since covers are manufactured for specific devices, the type and function of the RFID operation is determined by the type of device for which the cover will be used. In addition, the marks on the wireless device serve a marketing function, namely branding, independent of their relationship with the functional component.

Another preferred embodiment is the method of marketing a business and/or reinforcing brand awareness through a wireless device interface including the step of applying functional key overlays on a functional telephone keypad overlay to a functional component of a wireless device. Such application may be made strategically, as to attract the consumer to interact with the functional component. Strategic placement means placement of a mark in such a manner as to attract a user or consumer to use the component that has the mark.

Figure 5:
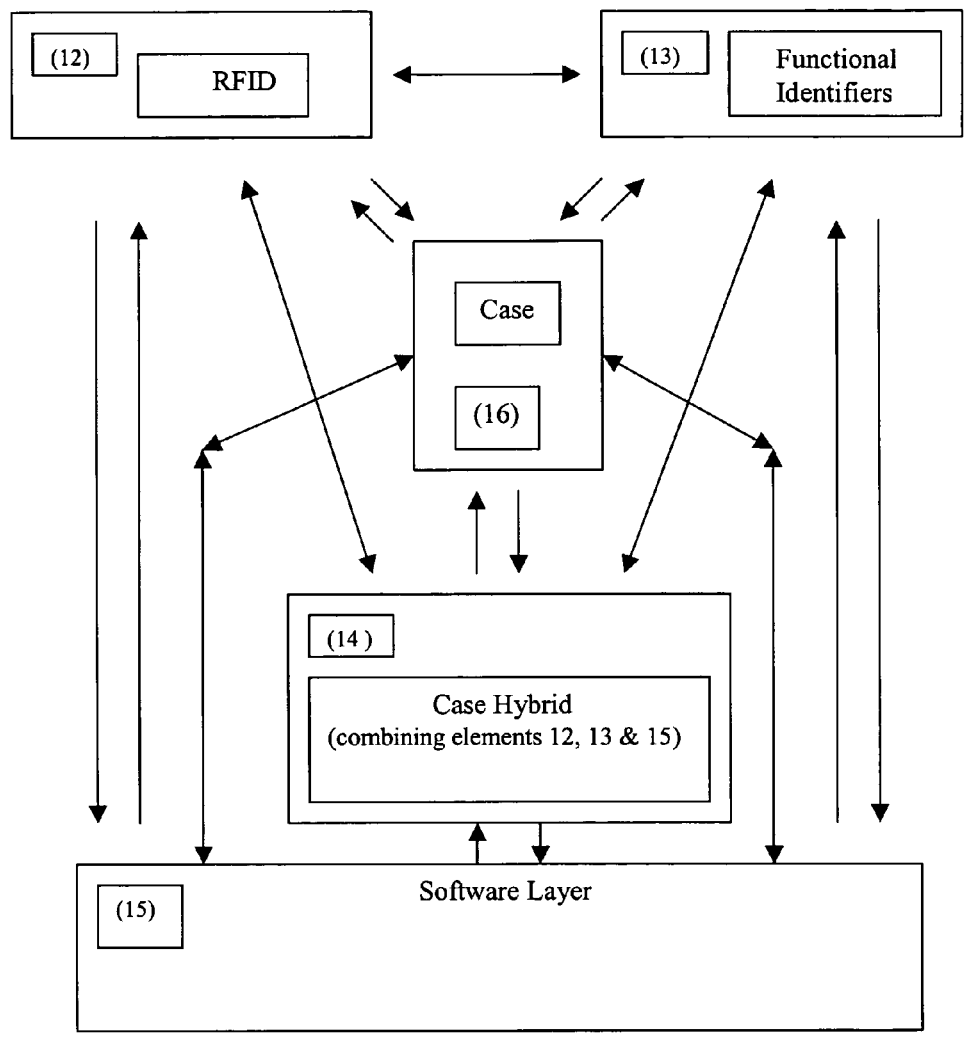
FIG. 5 is a schematic diagram showing relationships of components of the invention.

FIG. 5 is a schematic diagram showing relationships of components of the invention, namely RFID technology 12 included in the cover or overlay 16; functional key overlays 13 included in the cover or overlay; a hybrid 14 case, cover, or overlay including both RFID technology 12 and functional key overlays 13; and a software layer or component 15, running on a chip within the case 16 interacting with all other components. The schematic of FIG. 5 illustrates the various relationships acting in combination to form a total system, in part selectively combined, and/or separately, as appropriate for a given application or use of the present invention.

More specifically, Radio Frequency Identification Technology (RFID) includes active RFID, passive RFID, newer technologies being developed for use with RFID, such as near field communication RFID, and combinations thereof. Active RFID is typically either powered or uses a transponder-type system, which actively emits and/or receives a transmission or signal in some manner. A typical example of active RFID technology in use is highway toll booths. Passive RFID technology is typically activated by a reflecting signal emitted from an external reader or electronic device. An example of passive RFID technology application is the Speedpass system commercially manufactured by Texas Instruments and distributed by Exxon/Mobil. Newer technologies such as near field communication RFID, which in its simplest form is capable of combining secure communications wherein one device touches a second device for transmission/receiving communications between them. The foregoing is provided by way of example and not limitation, to facilitate explanation of the present invention. Any variation or application of RFID, from any period, including future developments for RFID and variations of embodiments including the same for single and multiple purposes, are intended to be included herein with the disclosure of the present invention and adapted thereto for various applications, as appropriate and evident to one of ordinary skill in the art. As set forth hereinabove, the RFID technology, component or device and/or integration with the case, overlay or cover, is used to mean any incarnation of RFID technology—internal, external, attached to the case or its surface, and combinations thereof.

Certain modifications and improvements will occur to those skilled in the art upon a reading of the foregoing description. By way of example, new components or extensions may be added to a wireless device that may be labeled with a functional key overlay. Also, the present invention may be applied to cordless communication devices, such as traditional telephones operating with a cordless handset but a corded base or receiver station.

All modifications and improvements have been deleted herein for the sake of conciseness and readability but are properly within the scope of the invention.

The invention claimed is:

1. A cover for electronic hand-held devices comprising: a cover for fully encasing an electronic hand-held device portable by a user; and a radio frequency identifier (RFID) device connected to the cover, wherein the user activates an account for business transactions by using the device in conjunction with the RFID-enabled cover, and wherein the device and RFID-enabled cover is operable for communication with RFID receivers/transmitters when the cover is located within a predetermined proximity of the receiver/transmitter and operable for completing a business transaction at the option of a user of the device, wherein the cover further includes functional, branded keys that are operable for additional electronic transactions by the user of the device.

2. The cover of claim 1, wherein the RFID device is embedded in the cover.

3. The cover of claim 1, wherein the RFID device is removably attached to the cover.

4. The cover of claim 1, wherein the RFID device is integrated with the cover.

5. The cover of claim 1, wherein the transactions include business transactions including payments for services and/or products.

6. The cover of claim 1, wherein the transactions include gaming.

7. The cover of claim 1, wherein the RFID device is operable to identify the user as having authorization to perform a predetermined function.

8. The cover of claim 1, wherein the RFID device is operable to identify the user as having authorization to pass through a security checkpoint and/or to identify the location of the user via a tracking system in communication with the RFID-enabled cover.

9. A portable electronic device for business transactions comprising:
 a hand-held electronic device having a cover for fully encasing an electronic hand-held device portable by a user; and
 a radio frequency identifier (RFID) device connected to the cover, wherein the user activates an account for business transactions by using the device in conjunction with the RFID-enabled cover, and wherein the device and RFID-enabled cover is operable for communication with RFID receivers/transmitters when the cover is located within a predetermined proximity of the receivers/transmitters when the cover is located within a predetermined proximity of the receiver/transmitters when the cover is located within a predetermined proximity of the receiver/transmitter and operable for completing a business transaction at the option of a user of the device, wherein the cover further includes functional, branded keys that are operable for additional electronic transactions by the user of the device.

10. The portable electronic device of claim 9, wherein the RFID device is embedded in the cover.

11. The portable electronic device of claim 9, wherein the RFID device is removably attached to the cover.

12. The portable electronic device of claim 9, wherein the RFID device is integrated with the cover.

13. The portable electronic device of claim 9, wherein the transactions include business transactions including payments for services and/or products.

14. The portable electronic device of claim 9, wherein the transactions include gaming.

15. The portable electronic device of claim 9, wherein the RFID device is operable to identity the user as having authorization to perform a predetermined function.

16. The portable electronic device of claim 9, wherein the RFID device is operable to identify the user as having authorization to pass through a security checkpoint and/or to identify the location of the user via a tracking system in communication with the RFID-enabled cover.

* * * * *